United States Patent Office 3,205,077
Patented Sept. 7, 1965

3,205,077
COATED POLYOLEFIN FILM AND MOISTURE EMITTING PRODUCT ENCLOSED THEREIN
John E. Hammond, Rochester, N.Y., assignor to National Distillers and Chemical Corporation, New York, N.Y., a corporation of Virginia
No Drawing. Filed Aug. 3, 1962, Ser. No. 214,496
8 Claims. (Cl. 99—174)

The present invention relates generally to improved thermoplastic sheeting and films and specifically to new anti-cling or anti-cling/anti-fogging polyolefin wrapping materials that are especially adapted to wrapping moisture-containing and moisture-emitting products such as fresh meats, poultry, fresh vegetables, and the like, and particularly for wrapping products that are subjected to refrigeration while so packaged. It is especially adapted for making such packaging materials from thermoplastic polymers of ethylene or of propylene, from copolymers thereof, and from copolymers of ethylene and of propylene with other polymerizable monomers.

It is an object of this invention to provide a method for making strong, anti-cling or anti-cling/anti-fogging packaging materials having improved optical properties, using thermoplastic polyolefin sheeting or film.

A further object of the invention is to provide an improved transparent wrapping material having resistance to cling.

It is a still further object of the invention to provide an improved transparent wrapping material for packaging moisture-containing food products in which the wrapping material is resistant to cling and to fogging which is caused by moisture condensing thereon when the wrapped products are subjected to temperature changes.

Another object is to provide an anti-cling wrapping material for moisture-containing products for which a polyolefin sheet or film is the base material or substrate.

It is a still further object of this invention to provide an improved strong, flexible wrapping material having good optical properties and relatively high permeability to oxygen and which is resistant to clinging or to clinging and fogging when used to encase moisture-containing food products, normally subjected to refrigeration.

Other objects and advantages of the invention will become apparent from the following description.

It has become wide-spread commercial practice in the merchandising of freshly cut meats and other produce to wrap individual items in films of transparent plastic material. The thus-wrapped products are visible through the packaging material and can be displayed, for example, in a refrigerated counter.

The characteristics of the wrapping material are very important for this type of application. The package should be attractive, and the inner surface of the plastic wrapping material must be resistant to fogging under conditions of refrigeration and during changes of temperature. Furthermore, the meat, poultry, or other product encased in such a package must remain fresh and retain its color during wrapping, display, and storage. For example, when used to encase freshly cut red meats, the package wrapping should transmit oxygen at a rate sufficient to retain the red color or so-called "bloom" of the meat. The film should also be capable of being readily and tightly sealed, preferably by heat, to substantially prevent leakage of moisture and juices contained in the completed package, and it should be easily dispensed, for example, from packs of film sheets.

The wrapping film material should be relatively impervious to moisture in order to prevent loss of moisture from the encased product. The wrapping film also must remain flexible and tough and must not tear or crack during use or become brittle.

Since many polyolefin plastic films inherently possess certain desired properties, including good strength, low water permeability, and excellent low temperature sealability, transparent polyolefin film or sheeting offers a good material for use as a substrate or base for such packaging materials.

Because of other inherent properties of polyolefin film, however, principally the hydrophobic characteristics of the film surface, after moisture-containing products are encased therein, water of condensation rapidly collects and remains on the inner surface of the film as droplets which results in fogging of the film and serious impairment of the transparency. In particular, it has been noticed that such condensation occurs more noticeably when the wrapped moisture-containing products are subjected to temperature changes such as refrigeration after having been packaged. Subsequently, cycles of temperature changes will also produce the fogging effect in a more pronounced and erratic fashion.

It has been found that a strong polyolefin wrapping material having improved properties can be produced by extruding the polyolefin sheeting or film at high temperatures and under certain critical conditions by the procedure to be described hereinafter, and then applying to one or both sides of the so-extruded sheeting or film one or more suitable coating compositions to be described hereinafter.

Polyolefin films and sheets suitable for use as transparent packaging materials, and especially those polyolefin films and sheets that have been prepared under the above-mentioned high temperatures and other critical conditions, often exhibit objectionable clinginess or stickiness, especially when the film is dispensed from packs of film sheets rather than from rolls of film. The film tends to adhere to itself when two or more surfaces of the film are pressed together, such as, for example, when sheets of the film are stacked in storage. It is especially pronounced at elevated temperatures and high relative humidities. Under normal storage conditions, the maximum temperatures encountered will be between about 100° and 110° F. It is desirable that under these temperature conditions the sheeting or film will not stick to itself. Otherwise, when the film is stored in cut sheet packages or in rolled form on cores, for example, the layers will cling or stick together and the sheets or layers of film cannot readily be separated for use. This "cling" can be eliminated, without deleteriously affecting the other properties that make the film particularly useful for packaging foodstuffs, flowers, and the like, by the application to at least one side of the film a composition comprising an aqueous solution of at least one alkali-soluble resin dissolved with a volatile base, an inert finely-divided diluent, and at least one polymer latex that is infusible at subsequent drying temperatures.

While a polyolefin substrate coated on one side with such an anti-cling coating composition and on the other side with an anti-fog coating composition, to be described in detail hereinafter, is the preferred embodiment of this invention, it is also possible to coat both sides of the film or sheet with an anti-cling coating; to coat one side of the substrate with an anti-cling coating and the other side with some other material, such as a structure with which lamination may be desired; or to coat one side of the substrate with an anti-cling coating and to leave the other side uncoated.

Although the practice of this invention will be illustrated with use of polyethylene film, the invention is not intended to be limited thereto. It is especially preferred in carrying out the invention to use as the polyolefin substrate or base a polyethylene film or a polypropylene film. It is, however, also possible to employ as the base material copolymers of ethylene and propylene, either with each other or with at least one other polymerizable monomer, such as, for example, those alpha-olefins having from 2 to 8 carbon atoms, such as 1-butene, 1-pentene, 1-hexene, 1-heptene, 1-octene, and mixed higher alpha-olefins. Comonomers which can be broadly used include monosubstituted ethylene such as 1-pentene, allyl benzene, $C_8$–$C_{14}$ mixed alpha-olefins, styrene, allyl naphthalene, and the like; 1,1-disubstituted ethylenes such as alpha-methyl styrene, 2-methylbutene-1, mixed alpha- and beta-pinenes, camphene, and the like; 1,2-disubstituted ethylenes such as indene, acenaphthylene, cyclopentene, norbornylene, cyclohexene, trans-stilbene, 2-pentene, and the like; acetylenes such as isopropenyl acetylene and phenyl acetylene; chloroolefins such as beta-methallyl chloride, chloromethyl norbornylene, and m-chlorostyrene; ethers; epoxides; esters such as vinyl butyrate, vinyl acetate, and methyl acrylate; and nitrogen compounds such as vinyl carbazole, 4-vinyl pyridine, and acrylonitrile. Blends of such polymers and copolymers can also be employed to make the substrate resins.

The polyolefin sheeting or film material that is selected to act as the base for the herein-disclosed coated packaging and wrapping material can be, for example, from about 0.25 up to about 5 mils in thickness, and the preferred film thickness is from about 0.5 to 1.5 mils. It is to be understood that films and sheeting materials of either lesser or greater thickness may also be employed in the practice of this invention, depending upon the end use intended for the coated product.

The physical properties of the substrate film employed should include high permeability, high strength, good handling characteristics, and good optical properties. Many low-density polyethylene resins yield films having poor optical properties, e.g., they have a high degree of haze and low "see-through" characteristics. It has been found that film extruded at high temperature has good optical properties and improved oxygen transmission. In order to get the desired characteristics, the polyolefin film is generally prepared from a low-density polyethylene resin, i.e., one having a density between about 0.905 and 0.923. The process of this invention, however, is not limited thereto, being applicable also to other resins of similar density properties as well as to resins of medium and high densities, whereby different properties may be enhanced.

In order to attain the desired optical and strength properties, the selected polyolefin resin should be extruded at high speed, high pressure, and high temperature, using as large an air gap (draw-down) distance through which the hot melt is drawn down from the die to the chill roll as is compatible with the operability of the process and the physical property requirements of the product. The speed of the extrusion is generally at least 100 feet per minute, and preferably is between about 100 to 600 feet per minute. The extruder pressure is generally in the range of about 1,000 to 10,000 pounds per square inch, and preferably about 2,000 to 4,000. The resin is extruded at a temperature of about 550° to 700° F., preferably at about 550° to 650° F. In addition, it is desired that the extruder be designed to provide the maximum shear on the melt, taking into consideration such extruder design factors as the depth of the roots of the flights of the extruder screw, the length of the metering zone on the screw, and the amount of shear in the extruder valve.

By drawing the film from the extruder at a high speed, i.e., at least 100 feet per minute, undesired "applesauce" (the textured appearance of the surface of a film) is avoided in the finished film to be used as substrate.

In order to achieve maximum permeability, it is important also that the film be quenched extremely rapidly. The hot resin melt should, therefore, be prevented from cooling until it hits the quench rolls. These rolls should be kept as cold as possible, and an air knife may be employed to force the film suddenly and rapidly against the chill roll. The hot melt may be shielded from premature cooling by any convenient means, such as by a shield or by blowing a small stream of heated air onto the hot melt.

By extruding the polyolefin resin under the conditions discussed above, a film having the desired properties of high permeability, high strength, good handleability, and good optical properties has been produced.

Extrusion under the above-described conditions also results in a somewhat crosslinked film, thus providing resistance to melt-through when the film is heat-sealed, reducing the brittle point of the film, and improving its toughness and solvent resistance. In addition, this process tends to produce a film having the ability to shrink when exposed to heat, thus providing a film that is particularly attractive for packaging operations. Shrinkability of the film may be enhanced by having as large as possible the air-gap through which the hot melt is drawn down to the chill roll, the allowable residence time for the film in this air-gap ranging from 0.01 to 0.001 minute, the optimum time being 0.006 minute.

In one embodiment, the film is coated on one side with an anti-cling composition made up of a selected alkali-soluble resin, an inert finely-divided diluent, and a selected fusible polymer latex in an aqueous base solution and on the other side, that is, the side in contact with the material being packaged, an anti-fog composition made up of a selected water-soluble polymer together with a selected solid, water-soluble inorganic material, such as an inorganic salt.

Although other materials may be added to the above-defined coating compositions in order to realize special advantages, it has been found essential in this embodiment to include at least one representative of each of the above classes of components in each of the coating compositions used in accordance with this specific embodiment of the invention.

As disclosed hereinbefore, the anti-cling coating composition is made up of three solid components in an aqueous base solution. The first essential component, that is, the alkali-soluble resin, can be at least one natural or a synthetic resin, with specific examples including shellac, Manila Loba gum, gum accroides, rosin-maleic acid or rosin-fumaric acid adducts alone or modified with polyhydric alcohols, zein, polyvinyl acetate-crotonic acid copolymers, polyacrylic acid ester copolymers, and the like, or mixtures thereof. These compounds are ordinarily very soluble in alcohol and are characterized by acid numbers between about 100 and 250. These resins are easily soluble in water with the assistance of a small amount of base, such as ammonia, morpholine, an ethanolamine, or the like, or mixtures thereof. The deposited resinous film becomes water-insoluble upon drying, thus rendering the coating relatively resistant to moisture. In addition, these resins exhibit marked adhesion to polyolefins, especially as very thin coatings, whereby the natural stiffness of the resins is reduced to a minimum. Although, as indicated above, any of a number of natural or synthetic resins can be used, shellac is preferred because of its pronounced adherence to polyolefins, its flexibility, its ready availability, and its ease of incorporation into coating formulations such as the one described above.

The second essential component of the anti-cling composition is an inert, finely-divided filler, such as bentonite, and other clays, talc, starches, diatomaceous earth, silica, and the like. Aqueous dispersed colloidal silica is preferred because of its particle size which is uniformly smaller (about 15 mu) than that of dry micro-silicas. The inert diluent reduces the tendency of the alkali-soluble resin to "block" under heat and pressure. In addition, it increases gas permeability of the coating; for example, if equal parts of shellac and silica were used, the permeability of a coated polyethylene substrate would remain substantially the same as that of the original uncoated polyethylene, whereas the application of the coating resin alone would markedly reduce the permeability of the coated substrate.

Although a coating of the alkali-soluble resin and the inert diluent alone is capable of reducing the stickiness of a film surface, the film surface will be very smooth, resulting in limp sheets of film having little slip between them. Slipperiness is imparted to such surfaces by making them uneven in a micro sense, thus reducing the area of surface contact. Synthetic polymer latexes having a particle size of <0.1 up to about 3 microns are suitable for this purpose. The selected latex should have a refractive index similar to that of the alkali-soluble resin and the polyolefin, i.e., between about 1.0 and 1.7, in order to provide optical homogeneity of the coated film. The latex particles should be sufficiently hard to resist pressure and moderate temperature deformation, and they should soften near the temperature used for heat sealing the coated film so that they will not interfere with the seal. Furthermore, the latex particles should not be film-forming unless fused, since coalescence when drying would destroy their particulate nature. A wide variety of materials can be used as the polymer particles, such as, for example, unplasticized polyvinyl chloride latex; emulsions of unoxidized polyethylene; polystyrene, polyacrylate, and methacrylate latexes; styrene-butadiene copolymers; and the like; or mixtures thereof.

It is to be understood that this is only one embodiment of the anti-cling coating composition and that the process of this invention is equally applicable to any other suitable anti-cling material and systems having one or more components.

Depending upon the method of application, the concentrations of the components of the anti-cling coating can vary over a wide range. Although the proportions of the individual components of the anti-cling composition in the total coating are not unduly critical, the ratio of the components to each other is important. The inert diluent solids must be present in an amount between about 20 to 150 phr. (parts per hundred of resin), since a lesser amount will not produce sufficient gas permeability in the coating and will have little effect on its surface hardness and a greater amount will produce excessive haziness and decrease the ability to heat seal effectively. The fusible resin latex solids should be present in an amount between about 1 and 60 phr., depending upon the particle size and chemical nature of the polymer. Lower ratios will not provide enough particles to reduce the film surface area contact effectively, and higher ratios will make "sliding" heat seals difficult to obtain. The base should be present in an amount sufficient to dissolve the alkali-soluble resin completely and to maintain the solution pH above 7.0.

The anti-cling coating can be applied to one or both sides of the polyolefin substrate film in any convenient manner, such as by brush, spray, roller coating, gravure, and the like, to produce a uniformly distributed coating. The excess coating solution can be removed by squeeze rolls, doctor knives, or the like. The anti-cling composition should be applied to the substrate in such an amount that there will be deposited upon drying a layer between about 0.00002 and 0.0005 gram per square inch, the preferred weight being about 0.0001 gram per square inch. When both the anti-cling coating and an anti-fog coating are used, the order in which they are applied is not unduly critical.

When it is desired to use an anti-fog coating in addition to the anti-cling coating, the basic and most essential component of the anti-fog coating is a water-soluble, highly-substituted cellulose ether, having for example at least one and preferably two or more ether linkages per anhydroglucose unit and at least one free hydroxyl group per anhydroglucose unit. The substituting groups can be methyl, ethyl, propyl, hydroxypropyl, or any combinations of these. It is essential that the cellulose ether employed be substantially water-soluble under the conditions of use, thus limiting to some extent the size of the substituting groups that may be present. For instance, any substitution of solubilizing groups on the substituting group itself is desirable, such as hydroxyethyl and hydroxypropyl groups, carboxymethyl groups, and the like.

As another highly desirable component of the anti-fog coating composition there should be present limited and controlled amounts of a water-soluble inorganic salt in order to increase the speed of the anti-fog action. It has been found that the inorganic material is needed to clear the fog quickly after it has formed on the film; possibly to prevent the initial formation of the fog; and also to aid in prolonging the anti-fog properties of the film. Typical water-soluble inorganic compounds that have been found to operate satisfactorily include sodium chloride, sodium carbonate, sodium bicarbonate, sodium silicate, sodium ortho and pyro phosphates, sodium nitrate, sodium nitrite, and sodium sulfate. Corresponding salts of potassium and other alkali metals, including ammonium salts, can also be used with good results. In general, however, sodium salts are preferred for food packaging. Any water-soluble salt can be used, if desired, provided that its presence in effective amounts does not interfere with the solubility of the cellulose ether component.

While the ratio of the components present in this aqueous anti-fog coating composition is not unduly critical, it has been discovered that a weight ratio of from 1 part of salt to 1 part of cellulose ether up to about 8 to 1 is quite adequate.

In another embodiment, the anti-fog coating composition is a three-component one. Here the basic and most essential component is a water-soluble surface active or wetting agent. For food products this wetting agent is preferably anionic, although a mixture of nonionic material plus a portion of anionic material can be used satisfactorily. Nonionic agents alone can be used, but when the wetting agent is solely nonionic, the film being coated may require additional treatment in order to get good application and/or adherence of the coating to the film surface.

Anionic types of surface active agents include alkali metal salts of compounds containing hydrophillic groups, such as sulfonated paraffinic hydrocarbons, sulfonated aromatic hydrocarbons, sulfonated alkyl hydrocarbons, sulfonated natural fatty materials, sulfonated fatty alcohols, sulfonated fatty acid esters, fatty acid amides, amino acids; alkali metal salts of sulfuric acid esters of fatty alcohols; alkali metal salts of phosphoric acid esters of fatty alcohols; and alkali metal salts of products obtained by the saponification of fats. Examples of suitable anionic agents include sodium oleate, sodium stearate, potassium oleate, potassium lauryl sulfate, and many other compounds, such as, for example, the commercial products "Nacconol NRSF" (sodium dodecylbenzene sulfonate), "Igepon T-77" (sodium N-methyl-N-oleoyl taurate), "Sipon" (sodium lauryl sulfate), "Maypon 4-C" (protein condensation product with oleoyl chloride), "Aquarex D" (sodium alkyl sulfate), "Aresklene" (dibutyl phenylphenol sodium disulfonate), "Avitex AD" (fatty alcohol sulfate), "Duponol" (fatty alcohol sulfates), "Tergitol" (sodium salt of alkyl sulfate), "Sarkosyl" (N-acyl sarcosines), "Sarkosyl NL-97" (sodium N-lauroyl sarcosinate), and the like, and mixtures thereof.

Nonionic types of wetting agents can be condensation products of fatty materials and their derivatives with ethylene oxide, condensation products of phenolic compounds having side chains with ethylene oxide, and condensation products of sorbitan and sorbitan esters with ethylene oxide. Suitable nonionic agents include polyethylene glycol fatty acid esters, such as the distearates; "Tweens" (polyoxyalkylene sorbitan fatty acid esters); and "Spans" (long-chain fatty acid partial esters of hexitol anhydrides).

In addition to the wetting agent at least one second component should be included in this anti-fog coating composition. This component is a water-soluble film-forming polymeric material, such as water-soluble resins, synthetic or natural gums, casein, pectins, algins, glues, gelatin, water-soluble starch derivatives, polyoxyethylenes, polyacrylic acids, and the like, or mixtures of these. Specific examples include carboxymethyl cellulose, carboxyethyl cellulose, hydroxymethyl cellulose, methylhydroxypropyl cellulose, polyvinyl pyrrolidene and its copolymers, propylene glycol alginate, polyvinyl alcohol, polyoxyethylene, and polycarboxymethylene. Such a film-forming material acts as a binder for the wetting agent and maintains it in the form of a thin coating that has sufficient adhesion to withstand normal handling. It also gives viscosity to the coating when re-wet and prolongs the anti-fog property of the wetting agent.

As the third component of this anti-fog coating composition there should be present limited amounts, controlled to at least 10 percent of active wetting agent, of a water-soluble inorganic salt in order to increase the speed of the anti-fog action by facilitating rapid solution of the wetting agent in the water of condensation that collects on the film. As previously discussed, the inorganic material is needed to clear the fog quickly after it has formed on the film; possibly to prevent the initial formation of fog; and also to aid in prolonging the anti-fog properties of the film Typical water-soluble inorganic compounds that have been found to operate satisfactorily when used in conjunction with the wetting agents include sodium chloride, sodium carbonate, sodium bicarbonate, sodium silicate, sodium ortho and pyro phosphates, sodium nitrate, sodium nitrite, and sodium sulfate. Corresponding salts of potassium and other alkali metals, including ammonium salts, can also be used with good results. In general, however, sodium salts are preferred for food packaging. Any water-soluble salt can be used, if desired, provided that its presence in effective amounts does not interfere with the solubility of the wetting agent component. For example, 2.0 parts by weight of tetrasodium pyrophosphate per 1.5 parts by weight of wetting agent is effective.

While the ratio of the components present in this aqueous anti-fog coating composition is not unduly critical, it has been discovered that a weight ratio of about 0.25 to 1.0 part by weight of water-soluble film-forming polymeric materials to from about 1 to 8 parts of inorganic salt to 1 part of wetting agent is quite adequate. In some cases, where the film forming material gives low viscosity solutions, up to 10 percent of the material can be used in the coating composition.

It is to be understood that these are only two embodiments of the anti-fog coating composition and that the process of this invention is equally applicable to any other suitable anti-fog material and systems having one or more components.

Thus, the anti-fog coating to be put onto the film and said coating containing the ingredients above-described is desirably water-soluble. The anti-fog coating thickness on the film can be in the approximate range of about 0.02 micron to 0.4 micron, and preferably is between about 0.05 micron and 0.1 micron. The actual amount of coating used on the film is about 0.0001 gram per square inch. In application of the coating onto the film, the amount can vary from about 0.00002 gram per square inch to about 0.0005 gram per square inch, although the amount of each material required for producing maximum anti-fog properties while retaining transparency of the base film varies, depending upon the exact base film and upon the coating components selected.

To achieve the best results, the coating of the base film by the anti-fog coating composition is done from an aqueous solution or dispersion containing the cellulose ether and the inorganic salts. The ether gum is slurried in a concentrated solution of the salt until the gum particles are well wetted-out, and the mixture is then diluted to the desired concentration. Other agents, as desired and as hereinafter disclosed, may be added subsequently or simultaneously to the mixture.

The anti-fog dispersion or solution, preferably in aqueous form, is applied to the polyolefin structure or surface in any convenient and known manner, such as dipping, spraying, brushing, roll coating, gravure coating, and the like preferably at a temperature of about 60° to 120° F. The excess aqueous coating solution may be removed by squeeze rolls, doctor knives, or the like. The coating composition should be applied in such an amount that there will be deposited upon drying a smooth, evenly distributed layer about 0.00002 to about 0.0005 gram per square inch, about 0.0001 gram per square inch being preferred. The thickness of the applied coating should be capable of dispersing moisture condensed thereon into a thin, relatively transparent film, spread evenly over the surface of the coated polyolefin film.

The coating on the polyolefin base are subsequently dried by hot air, radiant heat, or other convenient means. Upon drying, there is obtained a coated polyolefin film that has good permeability, high strength, good handling characteristics, good optical properties; that is resistant to cling or stickiness; that, if desired, is resistant to fogging by droplets of moisture condensed thereon; and that is adapted for use, for instance, as a wrapping material or film for moisture-containing food products.

For all items of food packaging it is imperative that the components contained in the anti-cling coating composition and in the anti-fog coating composition, if used, be non-toxic and substantially odorless.

Thus the above-described process, relating to the coating of a polyolefin film prepared by extrusion under severe conditions with an anti-cling composition or with anti-cling/anti-fogging compositions, provides a clear, strong, permeable film exceptionally useful as a wrap for fresh meat.

The products contemplated as being especially suited and well-adapted for packaging and for the packaging of which the sheeting and film material of this invention is particularly suited include moisture-containing and moisture-emitting products such as poultry, food produce such as fresh fruits and vegetables, bakery products, dairy products, fish, sea foods, fresh flowers, and the like.

It is contemplated in the broad aspects of this invention that the polyolefin structures are novel. It is also contemplated that the coated polyolefin structures are themselves novel, as well as the sealed packages, structures, and containers formed therefrom, either with or without the encasement of products therein.

While there are disclosed below but a limited number of embodiments of the invention herein presented, it is possible to produce still other embodiments without departing from the inventive concept herein disclosed, and it is desired therefore that only such limitations be imposed on the appended claims as are stated therein.

In each case gloss was measured in accordance with ASTM Test Method D523–53T and haze by ASTM Test Method D1003–52. Oxygen permeability was measured by the isostatic method described by D. W. Davis in "Paper Trade J.," v. 123, No. 9: 33–40 (1946).

To measure heat seal the test surfaces of a sample film were placed together and the two films were placed on an Armalon slide. A 1" x 4" x 1¼" Armalon-covered aluminum block was placed on top of the two films. The slide was pulled across a heated (480° F.) plate at a constant rate which allowed a 1-second dwell. The strength of seal was determined by manually pulling apart the sealed films and observing distortion and strength.

To determine wet seal retention a bag of the film to be tested was made with a 1" x 3" peelable bottom seal. A colored detergent solution was put into the bag, and the time required for the detergent to leak through the peelable seal was measured.

Example I

Part A.—One hundred parts of a polyethylene resin having a density of 0.917 and a melt index of 1.1 was homogenized on a Banbury mixer and extruded under the following conditions:

| | |
|---|---|
| Extrusion temperature, °F. | 650 |
| Extrusion pressure, p.s.i. | 3000 |
| Draw-down, inches | 11 |
| Line speed, feet per minute | 150 |
| Quench roll temperature, °F. | 40 |

The resulting polyethylene film was 1.0 mils thick, had a melt index of 0.2, a haze value of 1.5 percent, and a gloss value of 84 percent.

Part B.—A slurry of shellac (10.0 percent solids) in water (89.5 percent) was warmed to 120°–150° F. Ammonia was added to adjust the pH of the solution to about 9.0. The resulting resin solution was combined with aqueous dispersed colloidal silica (10.0 percent solids) and unplasticized polyvinyl chloride latex (0.5 percent solids) under moderate agitation. The resulting anti-cling coating composition was applied, at a coating speed of about 5 feet per minute from a smooth roll coater-smoothing roll assembly, to one side of the polyethylene film prepared in Part A of the example; the coating was then dried by radiant heat to yield a coating of about 0.0001 gram per square inch of dried solids.

The resulting coated film, which had good gloss, low haze, and good oxygen permeability, was arranged and stored at about 1000° F. as packs of film sheets, from which single sheets were easily dispensed. The coated film was then formed into a package which was easily heat sealed and which heat seals had good resistance to wet deterioration.

Part C.—One part of the methyl hydroxypropyl ether of cellulose, having a methoxy content of 28–30 percent, a hydroxypropoxyl content of 7–12 percent, and a viscosity of 4,000 centipoises, was slurried in six parts of a 20 percent by weight aqueous solution of sodium silicate and then diluted with water to 0.5 percent by weight of the cellulose ether.

The resulting 100 percent water-soluble anti-fog coating composition was applied by a gravure coating method to the side of the coated polyethylene film prepared in Part B of this example opposite to the side coated with the anti-cling coating composition; the coating was then dried by radiant heat to yield a coating of about 0.0001 gram per square inch of dried solids.

Part D.—The anti-cling, anti-fog coated film produced in Parts B and C hereof was used to encase fresh red meat by heat sealing the meat inside the package, using a specially protected hand iron to effect the seals. The anti-fog coated side of the film was in contact with the meat. The package was clear, transparent, strong, and without fog when placed under refrigeration at about 28° to 40° F. and remained free from fog during storage in such temperatures for up to 72 hours. When subjected to repeated cycles of cold storage followed by exposure to room temperature, no fog formed on the inner surfaces of the package. In addition, the heat seal had good resistance to wet deterioration.

Example II

The procedure of Example I, Part B, was repeated, except that the anti-cling coating was prepared with Manila Loba C gum (5.0 percent solids) instead of shellac. The results were comparable.

Example III

The procedure of Example I, Part B, was repeated, except that the anti-cling coating was prepared with "Poly-Em" (non-ionic unoxidized polyethylene latex) instead of an unplasticized polyvinyl chloride latex. The results were comparable, that is, the polyethylene film treated with the anti-cling film had low haze, good gloss, good oxygen permeability, good heat sealing, and good wet seal retention.

Example IV

The procedure of Example I, Parts B, C, and D, was repeated, except that the anti-fog coating was prepared by dissolving 1.5 parts of sodium dodecylbenzene sulfonate and 4.0 parts of tetrasodium pyrophosphate in 94.25 parts of demineralized water and then dissolving 0.25 part of sodium carboxymethyl cellulose in the solution with moderate agitation. Comparable results were obtained.

Example V

The procedure of Example I, Parts B, C, and D, was repeated, except that the alkali-soluble resin of the anti-cling coating was Manila Loba C gum instead of shellac and the anti-fog coating mixture contained 0.25 part of sodium carboxymethyl cellulose, 1.5 parts of sodium dodecylbenzene sulfonate, 2.0 parts of tetrasodium pyrophosphate, and 4.0 parts of aqueous colloidal silica, prepared by dissolving the sulfonate and phosphate in 92.25 parts of demineralized water, then dissolving the sodium carboxymethyl cellulose in the solution with moderate agitation and adding the colloidal silica to the solution. Comparable results were obtained.

Example VI

The procedure of Example I, Part B, was repeated, except that the film was coated on both sides with the anti-cling coating. The results were comparable.

While this invention has been disclosed and illustrated by the above examples, it will be understood that the invention is obviously subject to other modifications and variations without departing from its broader aspects.

What is claimed is:

1. A polyolefin film having an anti-cling coating on at least one surface thereof, said film having been prepared by extruding a polyolefin resin at a temperature between about 550° and 700° F., a pressure between about 1,000 and 10,000 pounds per square inch, and a speed of at least 100 feet per minute; said polyolefin being selected from the group consisting of polyethylene, polypropylene, and copolymers thereof; and said anti-cling coating having been formed from a composition comprising an aqueous base solution of at least one alkali-soluble resin, an inert finely-divided filler, and at least one fusible polymer latex, the thickness of the anti-cling coating being between about 0.00002 and 0.0005 gram per square inch.

2. As an article of manufacture, freshly cut red meat encased in a strong, transparent polyolefin film, the inner surface of which is coated with an anti-fogging composition and the outer surface of which is coated with an anti-cling composition, said film having been prepared by extruding a polyolefin resin at a temperature between about 550° and 700° F., a pressure between about 1,000 and 10,000 pounds per square inch, and a speed of at least 100 feet per minute; said polyolefin being selected from the group consisting of polyethylene, polypropylene, and copolymers thereof; said anti-cling composition having been formed from a composition comprising an aqueous base solution of at least one alkali-soluble resin, an inert finely-divided filler, and at least one fusible polymer latex; said anti-fogging composition having been selected from the group consisting of (1) compositions comprising at least one water-soluble cellulose ether and at least one water-soluble inorganic salt and (2) compositions comprising at least one water-soluble wetting agent, at least one water-soluble film-forming agent, and at least one water-soluble inorganic salt; and the thickness of the anti-cling composition and the anti-fogging composition each being between about 0.00002 and 0.0005 gram per square inch.

3. Moisture-emitting produce encased in a strong, transparent coated polyolefinic wrapping material, said wrapping material comprising a polyolefin substrate having on the inner surface thereof an anti-fogging composition and on the outer surface thereof an anti-cling composition, said polyolefin substrate having been prepared by extruding a polyolefin resin at a temperature between about 550° and 700° F., a pressure between about 1,000 and 10,000 pounds per square inch, and a speed of at least 100 feet per minute; said polyolefin being selected from the group consisting of polyethylene, polypropylene, and copolymers thereof; said anti-cling composition having been formed from a composition comprising an aqueous base solution of at least one alkali-soluble resin, an inert finely-divided filler, and at least one fusible polymer latex; said anti-fogging composition having been selected from the group consisting of (1) compositions comprising at least one water-soluble cellulose ether and at least one water-soluble inorganic salt and (2) compositions comprising at least one water-soluble wetting agent, at least one water soluble film-forming agent, and at least one water-soluble inorganic salt; and the thickness of the anti-cling composition and the anti-fogging composition each being between about 0.00002 and 0.0005 gram per square inch.

4. A package containing a moisture-emitting material encased in a clear, strong polyolefin film having an anti-fogging composition on the inner surface thereof and an anti-cling composition on the outer surface thereof, said film having been prepared by extruding a polyolefin resin at a temperature between about 550° and 700° F., a pressure between about 1,000 and 10,000 pounds per square inch, and a speed of between 100 and 1,000 feet per minute; said polyolefin being selected from the group consisting of polyethylene, polypropylene, and copolymers thereof; said anti-cling composition having been formed from a composition comprising an aqueous base solution of at least one alkali-soluble resin, an inert finely-divided filler, and at least one fusible polymer latex; said anti-fogging composition having been selected from the group consisting of (1) compositions comprising at least one water-soluble cellulose ether and at least one water-soluble inorganic salt and (2) compositions comprising at least one water-soluble wetting agent, at least one water-soluble film-forming agent, and at least one water-soluble inorganic salt; and the thickness of the anti-cling composition and the anti-fogging composition each being between about 0.00002 and 0.0005 gram per square inch.

5. A wrapping film as described in claim 1, wherein said polyolefin is polyethylene having a density of not more than 0.923.

6. A wrapping film as described in claim 1, wherein said film is extruded in a process employing a residence time between the extruder and the chill roll of not less than 0.001 minute.

7. A coated film as described in claim 1, having an anti-cling coating on one side and an anti-fogging coating on the other side, said anti-fogging coating being selected from the group consisting of (1) compositions comprising at least one water-soluble cellulose ether and at least one water-soluble inorganic salt and (2) compositions comprising at least one water-soluble wetting agent, at least one water-soluble film-forming agent, and at least one water-soluble inorganic salt.

8. A coated film as described in claim 1, wherein the anti-cling coating is formed from a composition comprising an aqueous base solution of shellac, colloidal silica, and an emulsion of unoxidized polyethylene.

References Cited by the Examiner

UNITED STATES PATENTS

| | | | |
|---|---|---|---|
| 2,772,172 | 11/56 | Carson | 99—174 |
| 2,824,023 | 2/58 | Banigan. | |
| 3,048,263 | 8/62 | Sacks et al. | 99—174 |
| 3,088,844 | 5/63 | Hungerford et al. | |

A. LOUIS MONACELL, *Primary Examiner.*

ABRAHAM H. WINKELSTEIN, *Examiner.*